Patented Feb. 6, 1945

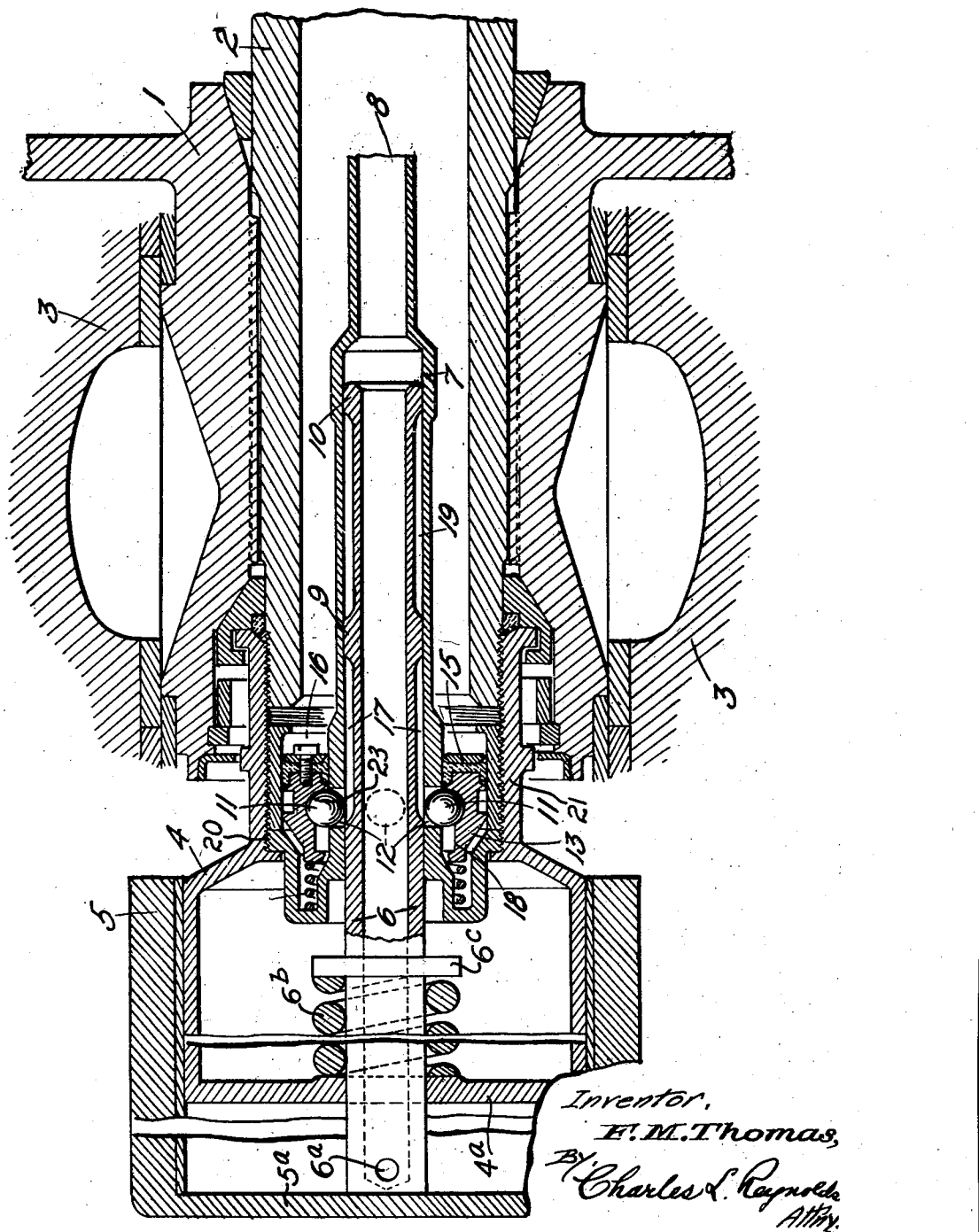

2,368,950

UNITED STATES PATENT OFFICE 2,368,950

VARIABLE PITCH AIRSCREW

Frederick Metcalf Thomas, Hatfield Aerodrome, Hertfordshire, England, assignor to The De Havilland Aircraft Company Limited, Hatfield Aerodrome, Hertfordshire, England Application November 7, 1938, Serial No. 239,385
In Great Britain November 11, 1937

16 Claims. (Cl. 170—163)

This invention relates to variable pitch airscrews, of the type wherein pitch changing mechanism, usually hydraulically controlled and operated in one sense at least, is mounted upon and for rotation with the airscrew, its hub, or its shaft, and is directly and mechanically connected, again by devices carried by the airscrew, hub, or shaft, and rotating therewith, for rotative shifting of the position of the blades, to change their pitch.

Such blades in their mounting usually have a possible angular range of adjustment or shifting which is more than sufficient to cover or include all normally required pitches, such as those required for take-off, high speed, and cruising. While the hydraulic, self-carried pitch changing means preferably has a range such that it can, itself, effect pitch changes throughout the entire possible range, and is capable of control to effect pitch change throughout that range, it is desirable to avoid any possibility of pitch adjustment, during normal operation, beyond the limits of the normal range, wherefore pitch stops defining the limits of the normal range are used. Under exceptional conditions it may be required to change the pitch beyond one or the other limit defined by such stops. For instance, it is necessary to achieve a far coarser pitch than is ever required during normal operation when the airscrew blades must be feathered, and, when the necessity therefor arises, the operation must be accomplished surely, quickly, and without likelihood of fumbling for an unfamiliar or seldom-used control. When fine pitch adjustments, beyond the normal lower limit, are required, the operation must be similarly accomplished. In either such case it is extremely desirable that the operation of releasing the normally effective and necessary pitch stop be achieved through the agency of a simple control (possibly the same control as effects normal pitch change, but differently operated or controlled, and possibly an altogether separate control), and by simple and wholly reliable means. These conditions can be best fulfilled by an hydraulically operated pitch stop release means mounted upon and for rotation with the airscrew, hub, or shaft, especially in an arrangement wherein the pitch changing means is similarly hydraulically operated and controlled, and is similarly mounted, for under such conditions the pitch stop release mechanism may be directly and simply associated with the pitch changing mechanism, and may be operated or controlled by the same pressure fluid, if desired, or alternatively by its own separate pressure fluid supply.

The chief object of the present invention is to provide comparatively simple and effective, easily operable, means, whereby whilst the scope of pitch change is limited for the normal conditions, such scope can be increased under control, to meet other conditions. As primarily intended to be applied, the increase of scope will be at the "fine pitch" end of the total scope. The invention provides (if it be required) that the total scope may be divided up into lesser scopes and one or other of these may be selectively chosen by operation of controlling means in appropriate conditions.

One embodiment of the invention is described with the aid of the accompanying drawing, which is a sectional diagrammatic view of an airscrew hub assembly incorporating the invention.

In the figure an airscrew hub 1 is mounted fast upon a hollow airscrew shaft 2, and supports two or more blades of which the root end is diagrammatically indicated at 3. The variation of pitch of the blades is effected by means of an hydraulic jack carried at the nose of and rotative with the airscrew shaft, and operatively connected (by known means, not shown) to the blades. This jack comprises an inner cylindrical part or piston 4 and outer cylinder 5, these being relatively sliding parts operated in one direction in any suitable manner, as, for example, by the supply of pressure oil through a lateral opening 6$^a$ in a tubular stem 6 into the space between the heads 4$^a$ and 5$^a$ of said parts, respectively, and operated in the opposite direction in any suitable manner as, for example, by means of a strong coil spring 6$^b$ interposed between the head 4$^a$ of the part 4 and a suitable abutment 6$^c$ on the stem 6. The stem 6 is co-axial with the piston 4 and cylinder 5 and with the axis of the shaft 2 and is operatively connected with the cylinder 5 so as to move therewith relatively to the piston 4, which latter is screwed to the shaft 2, thus during pitch change variation the stem 6 slides axially of the shaft 2, being guided at its inner end in a co-axially disposed cylinder element 7 which is fast to the piston 4 through the agency of a threaded connection at 20 and a threaded retainer sleeve 21. The cylindrical element 7 is connected by its extremity 8 to an hydraulic pressure source, either that which effects pitch change, or a separate source, distantly located, and to prevent leakage of oil between the relatively sliding parts 6 and 7 there may be provided any suitable glanding in the peripheral flanges 9 and 10 which are formed by recessing the stem 6 between certain predetermined points. It will be appreciated that the extent of movement of the stem 6 within the cylindrical element 7 is a function of the extent of variation of pitch change, and by preventing the relative sliding of the parts 6 and 7 the pitch variation may be controlled, and for this purpose in the illustrated embodiment, there are provided a plurality, e. g., four, balls 11. These balls are located in apertures 12 formed within the cylindrical part 7, and are surrounded by an annular piston or sleeve 13, which is resiliently urged, by a helical compression spring 14 to the right. An annular groove is formed within the sleeve 13, within which the balls are located in the position shown in the drawing, where it is assumed that the spring 14 is compressed by means of hydraulic pressure acting on the face of the annular piston 13. For the purpose of preventing oil leakage the piston 13 is provided with a packing 15 and the oil pressure is supplied to the annular space 16 through the annular passage external to the cylindrical element 7, and between the latter and the hollow airscrew shaft 2. If it is desired to operate the lock under the control of the pilot, the pressure inlet 8 for pitch variation is isolated so as to be hydraulically or operatively independent of the lock-operating mechanism. Where, however, the lock is operated by excess pressure rise in the system operating the pitch change mechanism, the element 7 may terminate at 8, as shown, and the hydraulic pressure from the automatically controlled source is supplied through the hollow bore of the airscrew shaft.

In the position of the parts shown, the outer cylinder 5 of the pitch changing jack is at its extreme right position (as is also the stem 6, connected to the cylinder 5) relative to the piston 4. It may be assumed that the balls 11 have been thrown centrifugally outwardly, to seat and to remain within the annular groove 23 within the interior of the sleeve-like piston 13 so long as there is no superior force to displace them. The spring 14 has been compressed by fluid pressure applied to the end face of the piston 13, and when this pressure is released, the spring's force supplies the superior force. Acting through the left edge of the groove 23, which engages the balls well outwardly of their centers, the spring 14 forces the balls inwardly, that is, out of this annular groove 23, and partly through the apertures 12, to a position wherein they are accommodated within the reduced portion 17 of the stem 6. The balls then lie within, and abut, the inner surface 18 of the sleeve 13. The stem 6 is then free to move, coincident with change of pitch, within the range determined by the length of the recess 17, which is limited at its right hand end by the flange or land 9. Since the balls are restrained by the surface 18, they can not move outwardly out of engagement with the recess 17.

The total range of adjustment, however, is greater than that so limited; the total range includes the length of the recess 19 in addition to the length of the recess 17. Thus the length 19 may correspond to the range of normal pitch variation, whilst the length 17 represents a further or abnormal range, for use under special conditions, for example, for fine pitch for use in taking off or landing.

When it is desired to employ the normal range, represented by 19, the piston 13 is subjected to pressure sufficient to overcome the spring 14 and to move the piston 13 to the left. Wherever the balls may be in the length of the recess 17, under the action of centrifugal force they move radially outward and are received within the groove 23. The balls in this position clear the lands or flanges 9, and by application of pressure within the pitch changing jack 4, 5, or by any equivalent action, the flange 9 passes freely by the stop mechanism, represented by the balls 11. Upon release of pressure acting upon the piston 13 the balls are forced inwardly, as previously described, but now lie within the recess 19—that is, within the normal range represented by the length of the recess 19, between the flanges 9 and 10.

The balls neither in the normal nor in the abnormal range exert any appreciable retardation upon the pitch changing operations, so long as such operations are within any single selected range, but until they are released in the manner indicated these balls prevent pitch changes outside the selected range. If desired, the total range of pitch variation may be split up into more than two stages, this being readily effected by forming the appropriate number of flanges corresponding to 9 in the drawing in predetermined positions. In such a case it may be necessary to provide the airscrew with pitch indicating means to determine the time of application of the operable pitch stops.

The sleeve 13 is not shiftable to a ball-releasing position, even though the tube 7 terminates at 8, by application of sufficient pressure to effect relative movement of the pitch changing jack 4, 5, which pressure is communicated also to the sleeve 13, for the reason that parts are so proportioned and arranged, under such circumstances, that a force in excess of that exerted by such pressure (for example, a materially greater pressure than is normally required for the pitch changing operation) is required to shift the sleeve 13 to the left. It is not to be understood that a greater pressure is necessarily required, under all circumstances, to shift the sleeve 13 to the left; when the tube 7 is connected independently of the fluid pressure within the bore of the shaft 2, to its own pressure source, it is immaterial which pressure is the greater, or if they be equal, for the application of ball-releasing pressure is then under external—usually manual—control.

What I claim is:

1. In pitch-changing mechanism for a variable pitch airscrew including a pitch-changing motor operatively connected with the airscrew blades and operable to control the sense of pitch change, whether increase or decrease, throughout a given total range, stop means operatively associated with said pitch-changing motor to limit pitch change to a normal range less than the total range, and mounted for rotation with the airscrew, said stop means including elements centrifugally operable to release said stop means, and a member normally restraining said elements and holding them in stopping position, and means operable under control to shift said restraining member to an inoperative position, whereby to enable pitch change beyond the normal range.

2. The combination of claim 1, wherein the shifting means includes an hydraulic receiver within and rotating with the airscrew shaft, and an hydraulic line connected for supply to or discharge of pressure fluid from said receiver.

3. In pitch-changing mechanism for a variable pitch airscrew including a pitch-changing motor operatively connected with the airscrew blades and operable to control the sense of pitch change, whether increase or decrease, throughout a given total range, a stem operatively connected to the motor to shift in accordance with movement of the motor, said stem having axially spaced stop shoulders, including a shoulder intermediate the terminal shoulders, the terminal shoulders defining the total range of pitch-changing movement of the motor, stop elements disposed for engagement with said shoulders, between the intermediate shoulder and another shoulder axially spaced therefrom, to limit pitch change to a normal range less than the total range, and means operable under control to withdraw said stop elements from shoulder-engaging position, whereby to enable pitch change beyond the normal range.

4. The combination of claim 3, wherein the stem is disposed coaxially of and within an axial bore of the airscrew shaft, and wherein the stop elements are centrifugally urged outwardly from engagement with the stop shoulders, and a restraining sleeve normally holds the stop elements in shoulder-engaging position, and is shiftable by the controlled means specified in claim 3 to permit centrifugal withdrawal of the stop elements.

5. The combination of claim 3, wherein the stem is disposed coaxially of and within an axial bore of the airscrew shaft, and wherein the stop elements are centrifugally urged outwardly from engagement with the stop shoulders, and a restraining sleeve normally holds the stop elements in shoulder-engaging position, and is shiftable by the controlled means specified in claim 3 to permit centrifugal withdrawal of the stop elements, and hydraulic receiver means mounted within the airscrew's bore, and operatively connected to the restraining sleeve to effect shifting of the latter, the combination further including an hydraulic line extending through the shaft's bore and connected to said receiver.

6. In pitch-changing mechanisms for a variable pitch airscrew carried by a rotative shaft having an axial bore, a pitch-changing hydraulic jack mounted upon the shaft for rotation with the airscrew, hydraulic means including a hollow stem connected for axial movement with a jack member, and extending through the bore in the airscrew shaft, to control the sense of operation of the jack to effect increase or decrease of pitch, throughout a given total range, stop means surrounding and engaging the stem, within the axial bore of and mounted for rotation with the airscrew shaft, and operatively associated with said jack to limit change of pitch to a normal range less than the total range, and means including an hydraulic line extending through the airscrew shaft, chargeable under control with a pressure fluid, and thereby operable to release said stop means from engagement with said stem, and thus upon suitable energization of the jack to effect pitch change beyond the normal range.

7. The combination defined in claim 13, in which the pitch-changing motor includes a cylinder reciprocable relative to the airscrew with which the reciprocable member is connected, and a piston rigid with the airscrew shaft and cooperating with said reciprocable cylinder, the stop means being carried by the airscrew shaft and being retractable by movement radially of the shaft out of a position engageable with the reciprocable member.

8. The combination of claim 16, in which the lineally reciprocable member is arranged coaxially within the airscrew shaft and is reciprocable axially with respect thereto, and the stop means are also arranged coaxially within the airscrew shaft and are shiftable radially relative to the lineally reciprocable member.

9. The combination of claim 16, in which the lineally reciprocable member is arranged coaxially of the airscrew shaft, and is reciprocable axially thereof, and the stop means include a plurality of balls held against axial movement relative to the airscrew shaft and spaced circumferentially about the reciprocable member, and spring means normally urging said balls radially inward for engagement with the shoulders on such reciprocable member, the means to effect retraction of the stop means including hydraulic means for counteracting the action of said spring means, thus enabling retraction of said balls in a radially outward direction by centrifugal force acting thereon.

10. In a variable pitch airscrew, means mounted on and rotatable with the airscrew hub, and operatively connected to move with the airscrew blades during pitch-changing movement thereof, stop means positively engageable with said first means by movement thereof to limit pitch change of the airscrew blades to a substantial pitch change range less than the entire possible range, but retractable to eliminate resistance to pitch-changing movement beyond the normal range, hydraulic means operable to retract said stop means out of the path of movement of said first means for uninterrupted movement thereof, and means to supply pressure fluid to said stop means.

11. In pitch-changing mechanism for a variable pitch airscrew operable to effect increase or decrease of pitch throughout a given total range, including a pitch-changing motor operatively connected with the airscrew blades, a member lineally reciprocable parallel to the airscrew shaft concurrently with pitch-changing movement of the blades having shoulders thereon spaced apart a distance equal to the range of reciprocation of said member corresponding to normal pitch change range of the airscrew, stop means mounted for rotation with the airscrew including a member engageable with one of said shoulders to stop said first member upon reciprocation thereof to a position corresponding to maximum blade pitch of the normal range, and engageable with the other shoulder to stop reciprocation of said first member in the opposite direction upon movement thereof to a position corresponding to minimum blade pitch of the normal range, thus to limit movement of said reciprocable member within a range corresponding to normal pitch-changing movement of the airscrew blades, and stop control means operable to effect retraction of said stop means radially of the airscrew shaft out of the path of reciprocation of said member.

12. In pitch-changing mechanism for a variable pitch airscrew operable to effect increase or decrease of pitch throughout a given total range, including a pitch-changing motor operatively connected with the airscrew blades, a member arranged coaxially with the airscrew shaft and reciprocable axially with respect thereto conjointly with pitch-changing movement of the airscrew blades, and having thereon shoulders spaced apart a distance equal to the reciprocatory movement of said member corresponding to normal pitch change movement of the airscrew blades, and stop means including a plurality of balls held against axial movement relative to the airscrew shaft and spaced circumferentially about the reciprocable member, engageable with one of said shoulders to stop reciprocation of said first member upon movement thereof to a position corresponding to maximum blade pitch of the normal range, and also positively engageable with the other shoulder to stop reciprocation of said first member upon movement thereof to a position corresponding to minimum blade pitch of the normal range.

13. The combination of claim 12, and means operable to effect shifting of the balls outward for reciprocation of a shoulder therebyond, enabling movement of the reciprocable member beyond the range corresponding to normal pitch-changing movement of the airscrew blades.

14. In a variable pitch airscrew, a pitch-changing motor mounted on and rotatable with the airscrew hub and operatively connected to move with the airscrew blades during increase or decrease in pitch thereof throughout a total range, control means for said pitch-changing motor operable by the pilot, stop means positively engageable with said pitch-changing motor only by movement of said motor to the end of a normal movement range corresponding to a substantial range of airscrew blade pitch change less than such total range, to limit pitch change of the airscrew blades to such lesser range, and stop control means separate from and operable by the pilot independently of said pitch-changing motor control means to retract said stop means out of motor engaging position for pitch-changing movement of said motor beyond such normal range.

15. In a variable pitch airscrew, a pitch-changing motor mounted on and rotatable with the air screw hub, and operatively connected to move with the airscrew blades during increase or decrease in pitch thereof throughout a total range, control means for said pitch-changing motor operable by the pilot, a member positively connected to said pitch-changing motor for movement therewith throughout such total possible range and having thereon a shoulder defining one end of a normal movement range portion of said member corresponding to a substantial range of airscrew blade pitch change less than such total range, stop means positively engageable with said shoulder by movement of said member, to interdict movement of said pitch-changing motor beyond such normal range, thereby to limit pitch change of the airscrew blades to such lesser range, and stop control means operable by the pilot to retract said stop means out of the path of movement of said shoulder for further pitch-changing movement of said motor in the same sense beyond such normal range.

16. In a variable pitch airscrew, a pitch-changing motor mounted on and rotatable with the airscrew hub and operatively connected to move with the airscrew blades during increase or decrease in pitch thereof throughout a total range, control means for said pitch-changing motor operable by the pilot, a lineally reciprocable member positively connected to said pitch-changing motor for movement therewith axially of the airscrew hub throughout such total range, and having thereon shoulders spaced apart a distance to define a normal movement range portion of said member corresponding to a substantial range of airscrew blade pitch change less than such total range, stop means normally interposed between said shoulders and operable to abut one or the other thereof by movement of said member to the corresponding end of such normal movement range, to interdict movement of said pitch-changing motor in the same sense beyond such normal range, thereby to limit pitch change of the airscrew blades to such lesser range, and stop control means operable by the pilot to retract said stop means out of the path of movement of a shoulder thus abutted for further pitch-changing movement of said motor in the same sense beyond such normal range.

FREDERICK M. THOMAS.